US008392659B2

(12) United States Patent
Anand et al.

(10) Patent No.: US 8,392,659 B2
(45) Date of Patent: Mar. 5, 2013

(54) EXTENDING CACHE CAPACITY ON MULTIPLE-CORE PROCESSOR SYSTEMS

(75) Inventors: Vaijayanthimala K. Anand, Austin, TX (US); Diane Garza Flemming, Pflugerville, TX (US); William A. Maron, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 12/612,767

(22) Filed: Nov. 5, 2009

(65) Prior Publication Data

US 2011/0107031 A1 May 5, 2011

(51) Int. Cl.
*G06F 12/08* (2006.01)

(52) U.S. Cl. ......................... 711/130; 711/118; 711/148

(58) Field of Classification Search ........................ None
See application file for complete search history.

(56) References Cited

U.S. PATENT DOCUMENTS

| | | | | |
|---|---|---|---|---|
| 7,240,160 | B1 | 7/2007 | Hetherington | |
| 7,472,224 | B1 | 12/2008 | Klass | |
| 7,512,837 | B1 | 3/2009 | Flemming | |
| 2005/0005073 | A1* | 1/2005 | Pruvost et al. | 711/148 |
| 2011/0010709 | A1* | 1/2011 | Anand et al. | 718/1 |
| 2011/0022803 | A1* | 1/2011 | Flemming et al. | 711/122 |

* cited by examiner

*Primary Examiner* — Than Nguyen
(74) *Attorney, Agent, or Firm* — David A. Mims, Jr.; Robert V. Wilder

(57) ABSTRACT

A method, programmed medium and system are provided for enabling a core's cache capacity to be increased by using the caches of the disabled or non-enabled cores on the same chip. Caches of disabled or non-enabled cores on a chip are made accessible to store cachelines for those chip cores that have been enabled, thereby extending cache capacity of enabled cores.

20 Claims, 4 Drawing Sheets

IMPROVE THREAD/CHIP PERFORMANCE

501 SYSTEM WITH ONLY A PORTION OF RESIDENT CORES ACTIVATED?

503 SPARE CORES DYNAMIC?

NO

505 GO TO DYNAMIC EXTENDED CACHE OPTION (ECO)

YES

507 ISOLATE SPARE CORES TO CHIPS AND ENABLE EXTENDED CACHE AT SYSTEM BRING-UP ONE TIME OR, BASED ON CONFIGURATION, DYNAMICALLY CHANGE CHIP CONFIGURATION

EXTENDING CACHE CAPACITY ON MULTIPLE-CORE PROCESSOR SYSTEMS

FIELD OF THE INVENTION

The present invention relates generally to information processing systems and more particularly to a methodology and implementation for providing expanded system memory capacity.

BACKGROUND OF THE INVENTION

The future of chip manufacturing involves creating denser and more complicated chip designs. The trend to maximize the performance of a chip has been to construct chips that incorporate more processing cores per chip. The designers of future product families envision many cores per chip, each with their own cache hierarchy.

Customers with a capacity-on-demand (COD) feature pay only for the chip cores that they use even though the system or chip may have more cores. These cores are enabled on demand. Until the time the customer pays for additional cores these cores are left disabled or in some "sleep" state. Some high end systems will have spare cores by design. This is in addition to cores left for COD. Thus, there are three types of cores, enabled, spare and disabled cores. The spare cores will not be enabled at all as customers will never be allowed to use these cores. These spare cores will be used for multiple purposes, such as, for example, (1) to replace failed cores, 2) for partition allocation where spares will be used to contain partitions but will not reduce the number of spares in the system, and 3) for load balancing in micro-partitioned systems, where spares will be used in lieu of remote cores for dispatching without increasing the enabled cores in the system. Therefore some cores in the system will always be disabled either for spares or for other purposes.

Thus, there is a need to provide an improved methodology to improve the overall system performance by taking advantage of available but unused cache capacity.

SUMMARY OF THE INVENTION

A method, programmed medium and system are provided for enabling a core's cache capacity to be increased by using the caches of the disabled cores on the same chip. Caches of disabled or non-enabled cores on a chip are made accessible to store cachelines for those chip cores that have been enabled, thereby extending cache capacity of enabled cores.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented in many ways. Since components which may be used to implement the functions used in practicing the present invention are composed of electronic components, software, circuits and fabrication methodologies which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

There are multiple ways to implement the disclosed extended cache option system and methodology. In one example, spare cores are distributed across all chips in a system so enabled (powered on) cores within a chip can access the caches of the disabled or non-enabled or spare cores to expand their cache capacity. For cache coherency purposes the enabled cores will treat the extended cache as its own cache but designate it as another level of cache so that it can maintain cache coherency of the extended cache across the system. In one embodiment enabled cores get another level of cache extension through a disabled processor. This extended cache of a disabled core can be dedicated solely to a single enabled core or can be allowed to be shared by multiple enabled cores depending on how it is implemented. If used as another level of cache for a single core, then L2 of a spare core X becomes L2.2 (exclusive) of enabled core Y, and L3 of the spare core X becomes L3.2 (exclusive) of enabled core Y. In this case enabled core Y has a mechanism to use L2 and L3 of spare core X as a victim cache by saving off the ones that are evicted from its own L2 and L3 or can use the extended cache to fetch new cache lines into these extended caches. In either case, a new mechanism needs to be added to by-pass the spare core processor processing and make the enabled core manage the extended cache, its directories and its cache coherence state. When a spare core is enabled, the additional mechanism added to enable core Y to manage core X's cache is disabled and thereby core Y loses its extended cache.

Figure 1:
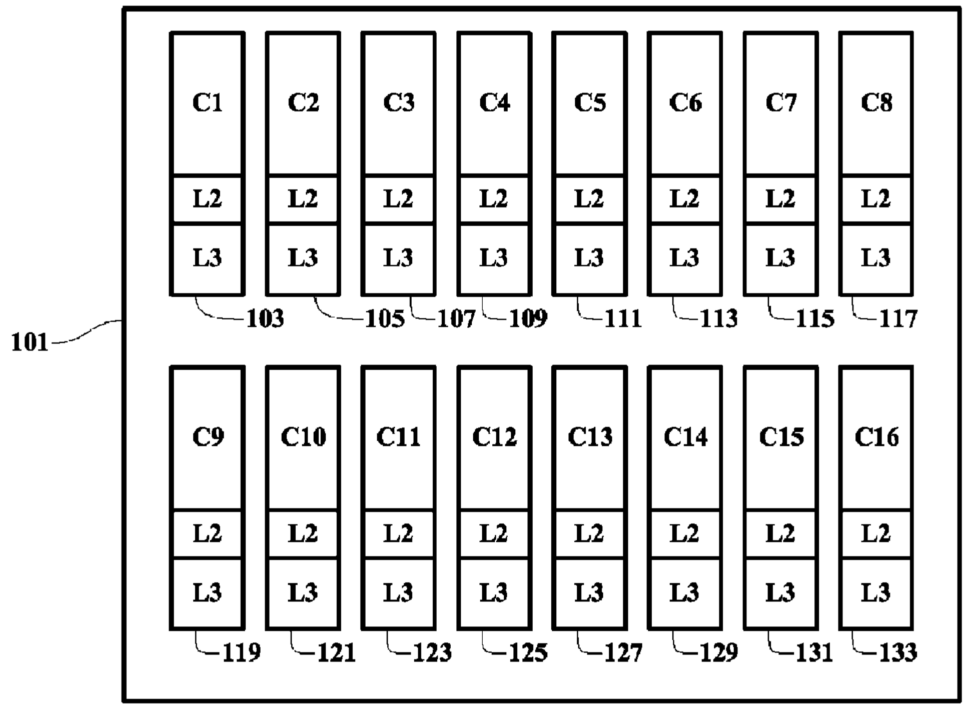
FIG. 1 is an illustration of an exemplary block diagram of a multi-core chip showing L2 and L3 cache levels for each core.

FIG. 1 illustrates a multi-core chip 101, having 16 processing cores 103-133 contained therein. Each of the cores includes a processor C1-C16 and corresponding L2 and L3 caches, respectively, associated therewith. Thus core 103-133 has a cache hierarchy associated therewith. Each chip will have a number of its processing cores 103-133 enabled for operation and the remaining processing cores will be unenabled or disabled, depending upon the customer's specification and intended application. The chips, however, are produced as a standard and will always contain a predetermined number of processing cores, whether enabled or disabled. Thus, in many cases, a chip will be installed in a system but have only one or several of its processing cores enabled, and the remaining inactive cores, including the caches associated with each of the inactive cores being disabled. Even in cases where a number of processors are not used or required, it is herein disclosed that the cache units associated with those inactive or non-enabled processors may be used and accessed to provide additional cache memory for the processors that are enabled and being used in the system.

Figure 2:
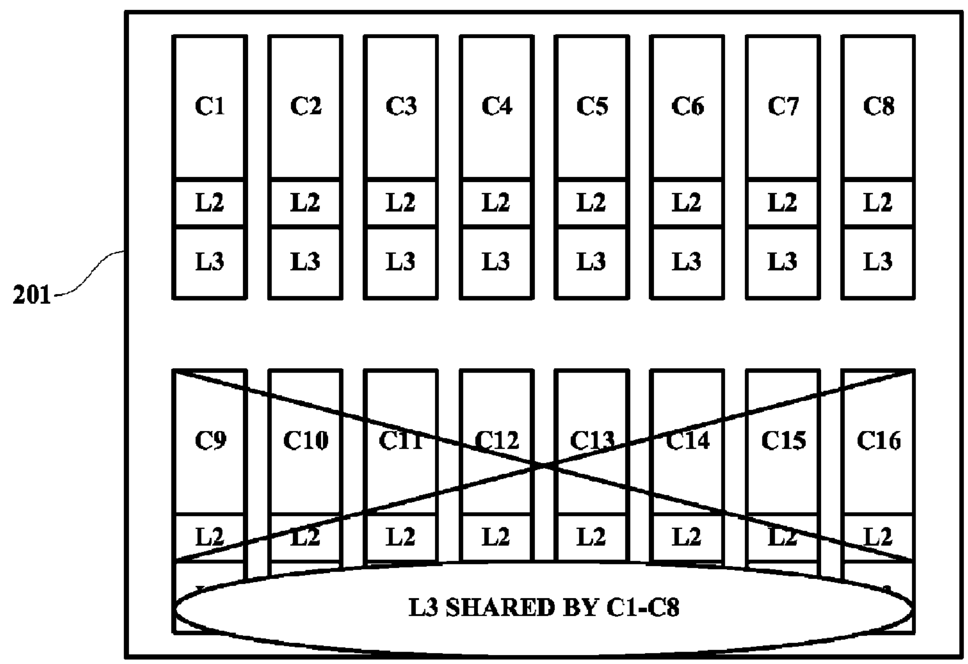
FIG. 2 is an illustration of an exemplary block diagram of a multi-core chip showing one method of sharing L3 cache levels for several inactive cores with other active cores on the same chip.

For example, FIG. 2 shows an exemplary chip 201 which includes 16 processing cores C1-C16, each having L2 and L3 cache levels associated therewith, respectively. In FIG. 2 cores C1-C8 are enabled for operation while cores C9-C16 have been disabled and are inactive and not needed for the intended application. However, in order to provide additional cache memory capacity for the enabled cores C1-C8, the L3 level cache for disabled cores C9-C16 is made available to the enabled cores C1-C8 and is shared by those cores. Firmware takes the addressing space of the L3 associated with each core C9-C16 and serves up addressing information to cores C1-C8, respectively, to provide additional remote cache capacity for each enabled core. This manipulation of the cache memories is transparent to operating system. The operating system need never know that the cache size is composed of local and remote space.

Figure 3:
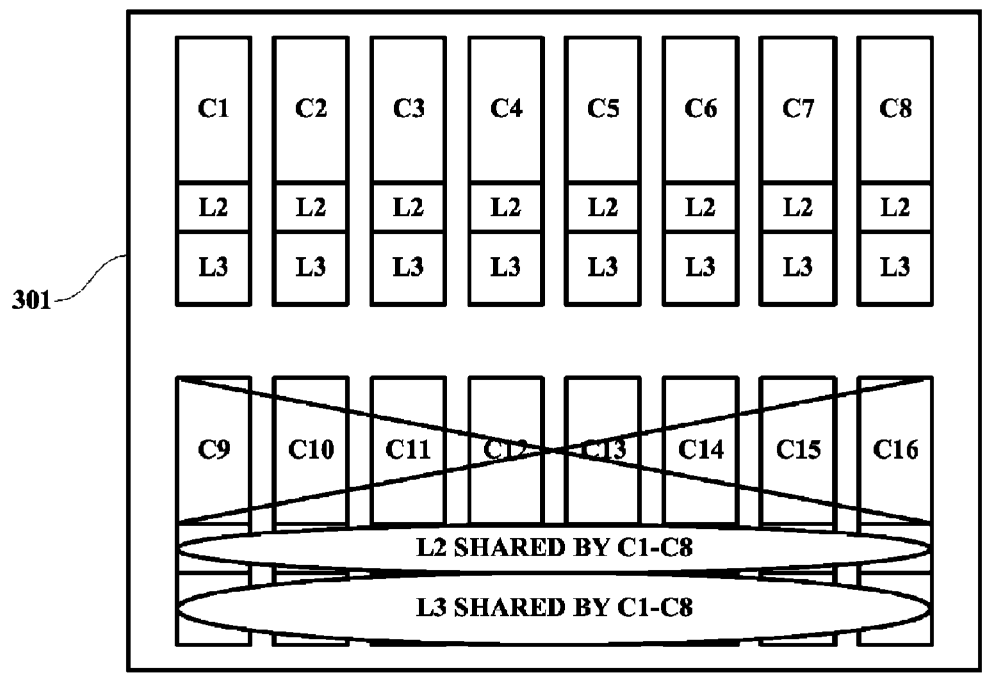
FIG. 3 is an illustration of an exemplary block diagram of a multi-core chip showing another method of sharing L2 and L3 cache levels for several inactive cores with other active cores on the same chip.
Figure 4:
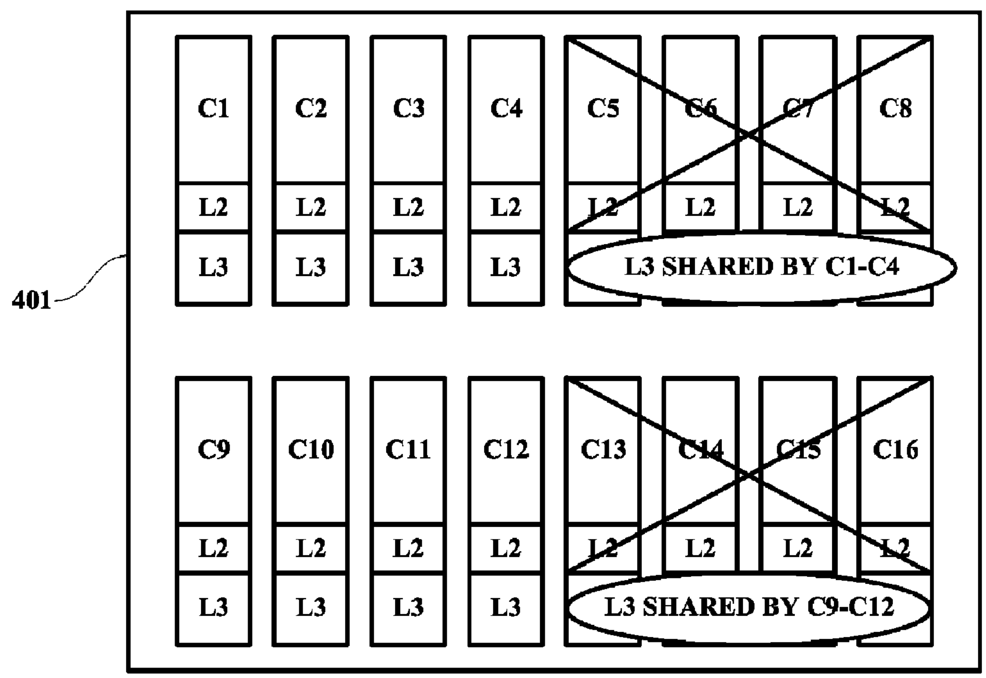
FIG. 4 is an illustration of an exemplary block diagram of a multi-core chip showing yet another method of sharing L3 cache levels for several inactive cores with other active cores on the same chip.

Many similar cache-sharing protocols may be implemented to provide additional cache capacity for enabled cores from unused caches on the same chip or other chips in a system. For example, FIG. 3 illustrates an application in which L2 and L3 level caches from disabled or inactive cores C9-C16 are shared with enabled cores C1-C8 on the same chip 301, and FIG. 4 illustrates an application in which L3 level caches from disabled or inactive cores C5-C8 are shared with enabled cores C1-C4 on the same chip 401 and L3 level caches from disabled or inactive cores C13-C16 are shared with enabled cores C9-C12.

An extended cache option system as herein disclosed may be provided with spare cores, in which case the spare cores are distributed in chips where high performance is desired, or the system can be provided with an extended core option (ECO) with factory pre-setting or good cores can be dynamically changed to extended cache cores. Exemplary processing which may be used to implement the extended cache option is illustrated in the flow charts of FIG. 5 and FIG. 6.

Figure 5:
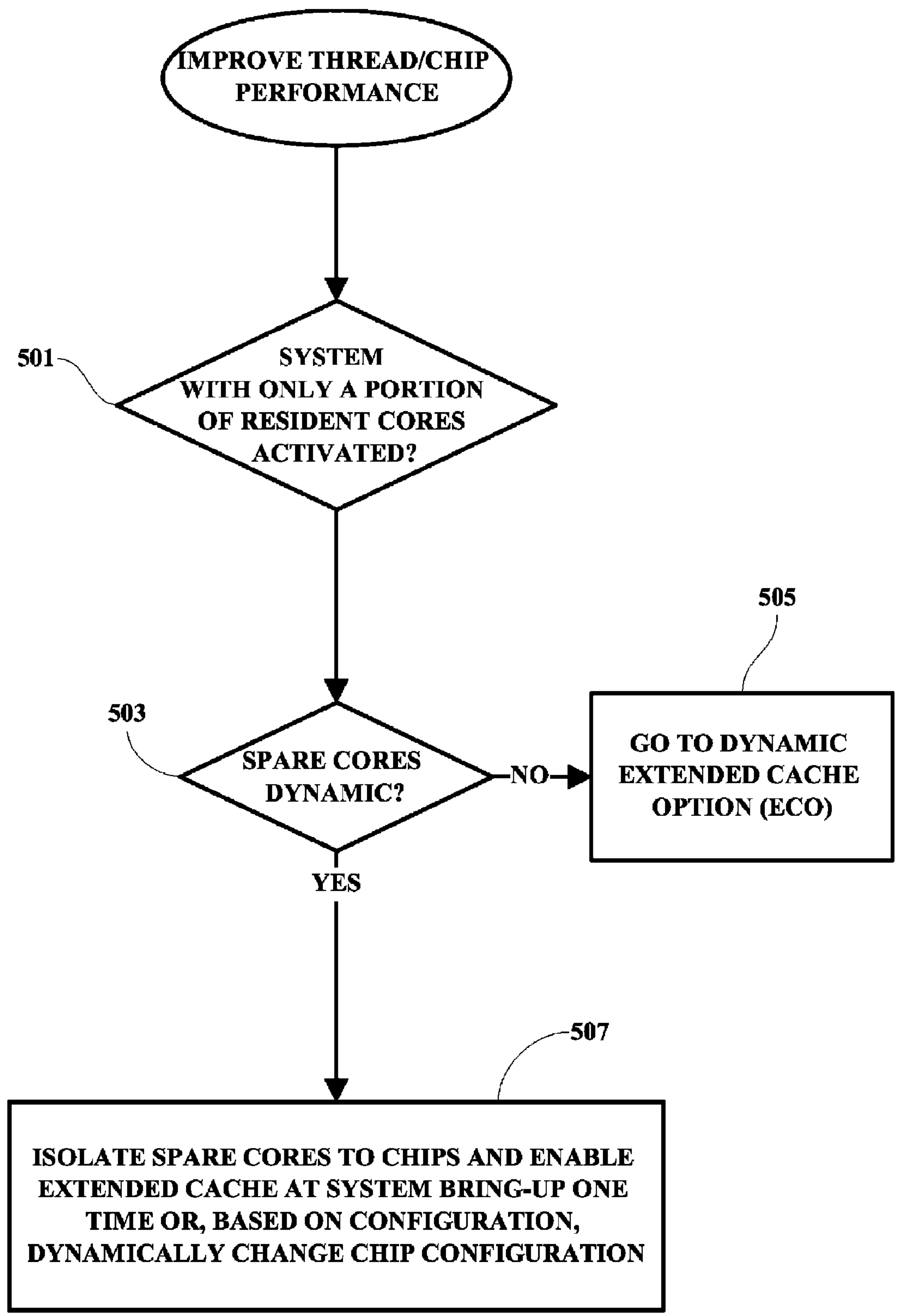
FIG. 5 is a flow chart illustrating an exemplary sequence of operations which may be implemented in accordance with the present invention.

In FIG. 5, the improvement of thread/chip performance in chips where only a portion of resident cores on a chip are activated 501, it is determined whether or not the spare cores are dynamic 503. If not, then extended cache options may be implemented on the chips that have spare cores 505. If the spare cores on a chip are dynamic 503, then the spare cores are placed based on optimization policy (either distribute spare cores evenly across all chips or select chips to distribute spare cores) 507 and the extended cache function is enabled one time at system bring-up.

Figure 6:
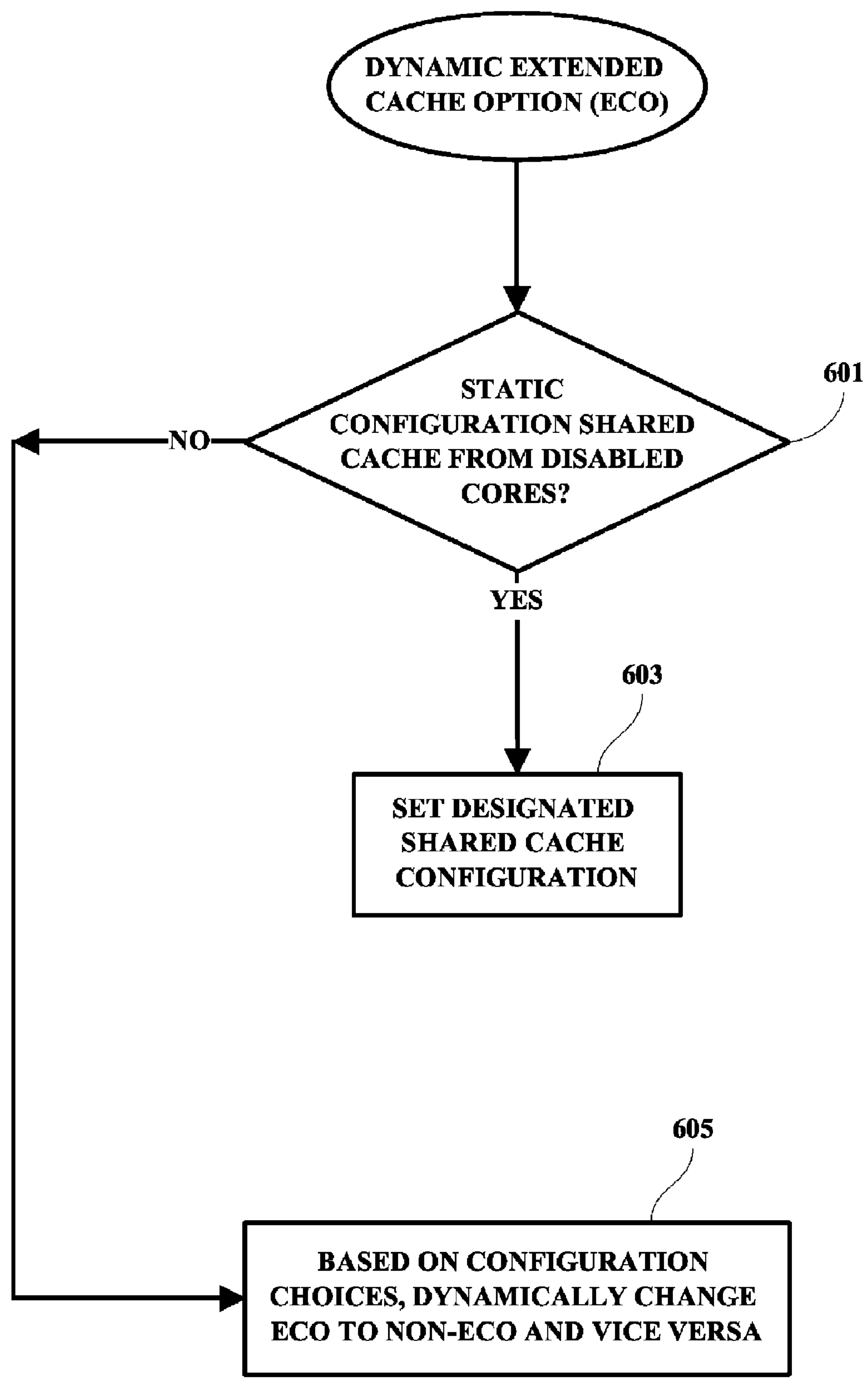
FIG. 6 is a flow chart illustrating an exemplary sequence of operations which may be implemented in accordance with the present invention.

Alternatively, based on partition configuration and preferences, the spare core assignment on chips may be dynamically assigned without rebooting the system as shown in FIG. 6 605.

In FIG. 6, for a dynamic extended cache option (ECO) function, if it is desired to provide a static configuration to share unused cache from disabled cores of a chip 601, then the designated spare core caches are combined to create a shared cache configuration, as illustrated, for example, in FIGS. 2-4, is set 603. If it is not desired to statically configure shared cache from disabled cores 601, then based on partition resource configuration choices, chips are selected to convert either to ECO or non-ECO dynamically without requiring a reboot of the system. That is, each chip's mode (ECO or non-ECO) will be converted while partitions are still active.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, or some combination of these and others).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

What is claimed is:

1. A method for increasing the cache capacity of one or more processing cores on a processor chip in a computer system, each of said processing cores having at least one cache associated therewith, said method comprising:

determining viable and enabled processing cores of a particular processor chip;

determining spare cores of said particular processor chip, said spare cores comprising viable but non-enabled processing cores of said particular chip;

determining spare core caches associated with said spare cores;

providing an extended cache option (ECO) mode whereby said spare core caches are used by said viable and enabled processing cores; and dynamically converting said processor chip between said ECO mode and a non-ECO mode.

2. The method as set forth in claim 1 wherein said ECO mode comprises:

determining a cache capacity of said viable and enabled processing cores;

determining a cache capacity of said viable but non-enabled processing cores;

dividing cache capacity of said viable but non-enabled processing cores by said viable and enabled processing cores; and distributing said cache capacity of said viable but non-enabled processing cores evenly among said viable and enabled processing cores on said processing chip.

3. The method as set forth in claim 2 wherein each of said processing cores includes L2 and L3 levels of cache associated therewith, said ECO mode further including:

sharing only said L3 levels of cache for viable but non-enabled processing cores for access by said viable and enabled processing cores.

4. The method as set forth in claim 2 wherein each of said processing cores includes L2 and L3 levels of cache associated therewith, said ECO mode further including:

sharing both of said L2 and L3 levels of cache for viable but non-enabled processing cores for access by said viable and enabled processing cores.

5. The method as set forth in claim 1 wherein said processor chip includes an even number of processing cores, said ECO mode further including:

configuring said processing cores into first and second groups, each of said groups having an equal number of processing cores included therein which together comprise said even number of processing cores;

enabling said first group of processing cores to provide said viable and enabled processing cores;

disabling said second group of processing cores to provide said viable but non-enabled processing cores; and configuring said caches of said first group of processing cores for access to said caches of said second group of processing cores.

6. The method as set forth in claim 1 wherein said processor chip includes an even number of processing cores, said ECO mode further including:

configuring said processing cores into first, second, third and fourth groups, each of said groups having an equal number of processing cores included therein which together comprise said even number of processing cores;

enabling said first and third groups of processing cores to provide said viable and enabled processing cores;

disabling said second and fourth groups of processing cores to provide said viable but non-enabled processing cores; and configuring said caches of said first and third groups of processing cores for access to said caches of said second and fourth groups of processing cores, respectively.

7. The method as set forth in claim 6 wherein each of said processing cores includes L2 and L3 levels of cache associated therewith, said ECO mode further including:

sharing only one of said L2 and L3 levels of cache for viable but non-enabled processing cores for access by said viable and enabled processing cores.

8. The method as set forth in claim 6 wherein each of said processing cores includes L2 and L3 levels of cache associated therewith, said ECO mode further including:

sharing both of said L2 and L3 levels of cache for viable but non-enabled processing cores for access by said viable and enabled processing cores.

9. A computer readable storage device including machine readable coded indicia, said storage device being selectively coupled to processing circuitry within a computer system, said machine readable coded indicia being configured for increasing the cache capacity of one or more processing cores on a processor chip, each of said processing cores having at least one cache associated therewith, said machine readable coded indicia being further configured for:

determining viable and enabled processing cores of a particular processor chip;

determining spare cores of said particular processor chip, said spare cores comprising viable but non-enabled processing cores of said particular chip;

determining spare core caches associated with said spare cores;

providing an extended cache option (ECO) mode whereby said spare core caches are used by said viable and enabled processing cores; and dynamically converting said processor chip between said ECO mode and a non-ECO mode.

10. The storage device as set forth in claim 9 wherein said ECO mode comprises:

determining a cache capacity of said viable and enabled processing cores;

determining a cache capacity of said viable but non-enabled processing cores;

dividing cache capacity of said viable but non-enabled processing cores by said viable and enabled processing cores; and distributing said cache capacity of said viable but non-enabled processing cores evenly among said viable and enabled processing cores on said processing chip.

11. The storage device as set forth in claim 10 wherein each of said processing cores includes L2 and L3 levels of cache associated therewith, said ECO mode further including:

sharing only said L3 levels of cache for viable but non-enabled processing cores for access by said viable and enabled processing cores.

12. The storage device as set forth in claim 10 wherein each of said processing cores includes L2 and L3 levels of cache associated therewith, said ECO mode further including:

a sharing both of said L2 and L3 levels of cache for viable but non-enabled processing cores for access by said viable and enabled processing cores.

13. The storage device as set forth in claim 9 wherein said processor chip includes an even number of processing cores, said ECO mode further including:

a configuring of said processing cores into first and second groups, each of said groups having an equal number of processing cores included therein which together comprise said even number of processing cores;

enabling said first group of processing cores to provide said viable and enabled processing cores;

disabling said second group of processing cores to provide said viable but non-enabled processing cores; and configuring said caches of said first group of processing cores for access to said caches of said second group of processing cores.

14. The storage device as set forth in claim 9 wherein said processor chip includes an even number of processing cores, said ECO mode further including:

a configuring of said processing cores into first, second, third and fourth groups, each of said groups having an equal number of processing cores included therein which together comprise said even number of processing cores;

enabling said first and third groups of processing cores to provide said viable and enabled processing cores;

disabling said second and fourth groups of processing cores to provide said viable but non-enabled processing cores; and configuring said caches of said first and third groups of processing cores for access to said caches of said second and fourth groups of processing cores, respectively.

15. The storage device as set forth in claim 14 wherein each of said processing cores includes L2 and L3 levels of cache associated therewith, said ECO mode further including:

a sharing only said L3 levels of cache for viable but non-enabled processing cores for access by said viable and enabled processing cores.

16. The storage device as set forth in claim 14 wherein each of said processing cores includes L2 and L3 levels of cache associated therewith, said ECO mode further including:

a sharing both of said L2 and L3 levels of cache for viable but non-enabled processing cores for access by said viable and enabled processing cores.

17. A system for increasing the cache capacity of one or more processing cores on a processor chip, each of said processing cores having at least one cache associated therewith, said system comprising:

a processing device for determining viable and enabled processing cores of a particular processor chip;

said processing device being further operable for determining spare cores of said particular processor chip, said spare cores comprising viable but non-enabled processing cores of said particular chip; and determining spare core caches associated with said spare cores;

providing an extended cache option (ECO) mode whereby said spare core caches are used by said viable and enabled processing cores; and converting device for dynamically converting said processor chip between said ECO mode and a non-ECO mode, said converting being accomplished while storage partitions remain active and without requiring a re-boot of said system.

18. The system as set forth in claim 17 wherein said system further comprises:

a processing device for determining a cache capacity of said viable and enabled processing cores;

said processing device being further operable for determining a cache capacity of said viable but non-enabled processing cores;

a calculating device for dividing cache capacity of said viable but non-enabled processing cores by said viable and enabled processing cores; and a distribution device for distributing said cache capacity of said viable but non-enabled processing cores evenly among said viable and enabled processing cores on said processing chip.

19. The system as set forth in claim 18 wherein each of said processing cores includes L2 and L3 levels of cache associated therewith, said system further including:

a sharing device for sharing only said L3 levels of cache for viable but non-enabled processing cores for access by said viable and enabled processing cores.

20. The system as set forth in claim 18 wherein each of said processing cores includes L2 and L3 levels of cache associated therewith, said system further including:

a sharing device for sharing both of said L2 and L3 levels of cache for viable but non-enabled processing cores for access by said viable and enabled processing cores.

* * * * *